(12) United States Patent
Bae et al.

(10) Patent No.: US 7,920,228 B2
(45) Date of Patent: Apr. 5, 2011

(54) DUAL LIQUID CRYSTAL DISPLAY DEVICE

(75) Inventors: Kyu-Han Bae, Yongin (KR); Shawn Kim, Yongin (KR); James Kim, Yongin (KR); Chang-Won Lee, Yongin (KR); Hwal Choi, Yongin (KR); David Lee, Yongin (KR)

(73) Assignee: Samsung Mobile Display Co., Ltd., Giheung-Gu, Yongin, Gyunggi-Do (KR)

( * ) Notice: Subject to any disclaimer, the term of this patent is extended or adjusted under 35 U.S.C. 154(b) by 218 days.

(21) Appl. No.: 12/385,213

(22) Filed: Apr. 1, 2009

(65) Prior Publication Data

US 2009/0316075 A1    Dec. 24, 2009

(30) Foreign Application Priority Data

Jun. 24, 2008    (KR) .................. 10-2008-0059655

(51) Int. Cl.
*G02F 1/133* (2006.01)
(52) U.S. Cl. .......................................... 349/73
(58) Field of Classification Search .................. 349/73
See application file for complete search history.

(56) References Cited

FOREIGN PATENT DOCUMENTS

| | | |
|---|---|---|
| JP | 2005-070201 | 3/2005 |
| KR | 10-2004-0002545 | 1/2004 |
| KR | 10-2004-0033131 | 4/2004 |
| KR | 10-2007-0010568 | 1/2007 |
| KR | 1020070010568 A | 1/2007 |
| KR | 10-2007-0117077 | 12/2007 |
| KR | 10-2007-0119227 | 12/2007 |
| KR | 1020070119227 A | 12/2007 |

OTHER PUBLICATIONS

Korean Office Action dated Sep. 29, 2009 for the corresponding Korean Priority Application No. 10-2008-0059655.

*Primary Examiner* — David Nelms
*Assistant Examiner* — Phu Vu
(74) *Attorney, Agent, or Firm* — Robert E. Bushnell, Esq.

(57) ABSTRACT

A dual liquid crystal display device includes a transmissive liquid crystal display panel; a reflective liquid crystal display panel formed on the same substrate as the transmissive liquid crystal display panel; a first light guide block disposed under the transmissive liquid crystal display panel and having dot patterns formed on a first surface thereof; a second light guide block disposed under the reflective liquid crystal display panel and having V-grooves formed on a first surface thereof and dot pattern formed on a second surface thereof; a light source disposed adjacent to the first light guide block; and a housing in which the transmissive and reflective liquid crystal display panels, the light source and the light guide blocks are seated, the housing having an opening to correspond to an image display surface of the reflective liquid crystal display panel.

13 Claims, 3 Drawing Sheets

DUAL LIQUID CRYSTAL DISPLAY DEVICE

CLAIM OF PRIORITY

This application makes reference to, incorporates the same herein, and claims all benefits accruing under 35 U.S.C. §119 from an application for DUAL LIQUID CRYSTAL DISPLAY DEVICE earlier filed in the Korean Intellectual Property Office on 24 Jun. 2008 and there duly assigned Serial No. 10-2008-0059655.

BACKGROUND OF THE INVENTION

1. Field of the Invention

The present invention relates to a liquid crystal display device, and more particularly to a dual liquid crystal display device comprising a transmissive liquid crystal display panel and a reflective liquid crystal display panel.

2. Description of the Related Art

A liquid crystal display device is a flat panel display having advantages that it is manufactured in a small and thin scale and driven with low power consumption, and therefore it has been used in portable computers such as notebook PCs, office automation equipments, audio/video equipments, etc. Examples of such devices are as follows:

U.S. Pat. No. 7,193,666 to Jung-Min Choi et al. and entitled DUAL LIQUID CRYSTAL DISPLAY DEVICE describes an LCD device for performing bi-directional display. The LCD device includes first and second display units, and a light supplying unit. The first display unit includes an LCD panel and a transflective film that is disposed under the LCD panel and has layers in which first and second layers having different refractivity indexes are alternately stacked. The transflective film partially reflects and transmits light incident onto the film. The light supplying unit is disposed between the first and second display units, and provide the first and second display units with light generated from a lamp by dividing the light, to thereby regulate a contrast ratio of a luminance between the first and second display units;

U.S. Pat. No. 7,075,597 to Chi-Jain Wen et al, and entitled DUAL-SCREEN LIQUID CRYSTAL DISPLAY discloses a dual-screen liquid crystal display including three substrates. The first substrate has a first surface and a second surface. The first reflector layer, the first liquid crystal layer, the second substrate and the first polarization film are sequentially disposed on the first surface of the first substrate to form the first reflective LCD. The second reflector layer, the second liquid crystal layer, the third substrate and the second polarization film are sequentially disposed on the second surface of the first substrate to form the second reflective LCD; and U.S. Pat. No. 7,034,799 to Seog-Geun Lee et al. and entitled BACKLIGHTING DEVICE FOR DUAL LIQUID CRYSTAL DISPLAY AND FOLDER-TYPE MOBILE PHONE THEREWITH describes a backlighting device for a dual LCD (Liquid Crystal Display). The backlighting device includes a circuit board with a through hole; a backlighting illumination device situated within the hole for radiating light in a first direction substantially perpendicular to a first face of the circuit board and in a second direction substantially perpendicular to a second face of the circuit board; a main LCD being situated on one face of the backlighting illumination device in the first direction, for displaying first information in the first direction; and a slave LCD being situated on another face of the backlighting illumination device through the through hole in the second direction, for displaying second information in the second direction.

A liquid crystal display device functions to display a picture or an image by controlling an electric field to transmit or cut off light, the electric field being applied to liquid crystal materials having dielectric anisotropy. The liquid crystal display device uses an external light without generating light by itself, unlike display devices, such as an organic light emitting display device (OLED) and a cathode ray tube (CRT), that generate light by itself.

In general, the liquid crystal display devices are mainly divided into transmissive and reflective liquid crystal display devices, depending on the manners of employing light.

That is to say, the liquid crystal display devices are divided into a transmissive liquid crystal display device and a reflective liquid crystal display device, depending on whether it uses a separate backlight or reflected external light as its power source, and there has also been an attempt to develop a transflective liquid crystal display device in which a transmissive liquid crystal display device are combined with a reflective liquid crystal display device.

Also, a dual liquid crystal display device displaying a picture on both sides of a liquid crystal display device has been developed recently. The dual liquid crystal display device displays a picture on both sides thereof since it includes a main liquid crystal display panel and a sub liquid crystal display panel, both of which are formed on both sides thereof, respectively.

However, conventional dual liquid crystal display devices have disadvantages that they are thick and heavy, and their power consumption is high since a backlight needs to be installed for each of the main liquid crystal display panels and the sub liquid crystal display panels.

This trend runs against small and thin portable devices such as mobile phones using a liquid crystal display device, and therefore the liquid crystal display device has major problems in aspect of slimness and cost saving.

SUMMARY OF THE INVENTION

Accordingly, the present invention is designed to solve such drawbacks of the prior art, and therefore an object of the present invention is to provide a dual liquid crystal display device including a first transmissive liquid crystal display panel to display an image on a first surface and a second reflective liquid crystal display panel to display an image on a second surface and being able to maximize slimness and cost efficiency by forming the first and second liquid crystal display panels with the same substrate.

Also, another object of the present invention is to provide a dual liquid crystal display device having a light guide formed in lower portions of the first and second liquid crystal display panels, the light guide including a first light guide block corresponding to the first liquid crystal display panel and having dot patterns formed in a first surface thereof, and a second light guide block corresponding to the second liquid crystal display panel and having V-grooves formed in a first surface thereof and dot patterns formed in a second surface thereof, and particularly being able to control the brightness uniformity and to easily control the quantity of light and other characteristics by forming a dual brightness enhancement film on a corresponding surface of the second light guide block.

One embodiment of the present invention is achieved by providing a dual liquid crystal display device including a first liquid crystal display panel displaying an image on a first surface thereof; a second liquid crystal display panel formed on the same substrate as the first liquid crystal display panel to display an image on a second surface thereof; a light source disposed at an adjacent side under the first liquid crystal display panel; a light guide disposed under the first and second liquid crystal display panels and including a first light guide block corresponding to the first liquid crystal display panel and having dot patterns formed on a first surface thereof and a second light guide block corresponding to the second liquid crystal display panel and having V-grooves formed on a first surface thereof and dot pattern formed on a second surface thereof; and a housing settling the first and second liquid crystal display panels, the light source and the light guide and having an opening to correspond to an image display surface of the second liquid crystal display panel.

In this case, the first liquid crystal display panel may be realized with a transmissive liquid crystal display panel, and the second liquid crystal display panel may be realized with a reflective liquid crystal display panel. Also, the first and second liquid crystal display panels may be formed respectively in different regions (a first region and a second region) of first and second substrates that are a pair of the same substrates.

Also, a thin film transistor array and a transparent electrode may be formed in a region corresponding to the first region of the first substrate, a thin film transistor array and a reflective electrode may be formed in a region corresponding to the second region of the first substrate, and a common electrode and a color filter pattern may be formed in the first and second regions of the second substrate corresponding to the first and second regions of the first substrate, respectively.

In addition, a drive circuit block driving the first and second liquid crystal display panels may be installed at one side of the first substrate outside the first or second region, and first polarizing plates and second polarizing plates may be formed on upper/lower sides of the first and second liquid crystal display panels, respectively.

Furthermore, the first light guide block may be disposed adjacent to the light source.

According to the present invention as described above, the dual liquid crystal display device is advantageously manufactured to be slim in thickness since it has a dual structure with the same thickness as the conventional single structure liquid crystal display devices. Also, the dual liquid crystal display device according to the present invention has advantages in aspect of cost efficiency in that the manufacturing cost such as the material cost and the processing cost may be significantly reduced by realizing a liquid crystal display device with a dual structure using one sheet of panel.

Also, a light guide is formed in a lower portion of the first and second liquid crystal display panel, the light guide including a first light guide block corresponding to the first liquid crystal display panel and having dot patterns formed on a first surface thereof, and a second light guide block corresponding to the second liquid crystal display panel and having V-grooves formed on a first surface thereof and dot patterns formed on a second surface that is an opposite surface to the first surface. Therefore, the light guide may be useful to control brightness uniformity and easily control the quantity of light and the other characteristics, as well as to improve the viewing angle and vision for the reflective liquid crystal display panel.

Also, the dual liquid crystal display device according to the present invention has advantages that its brightness uniformity may be controlled in a more effective manner since the first liquid crystal display panel as the transmissive liquid crystal display panel is disposed adjacent to a light source.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
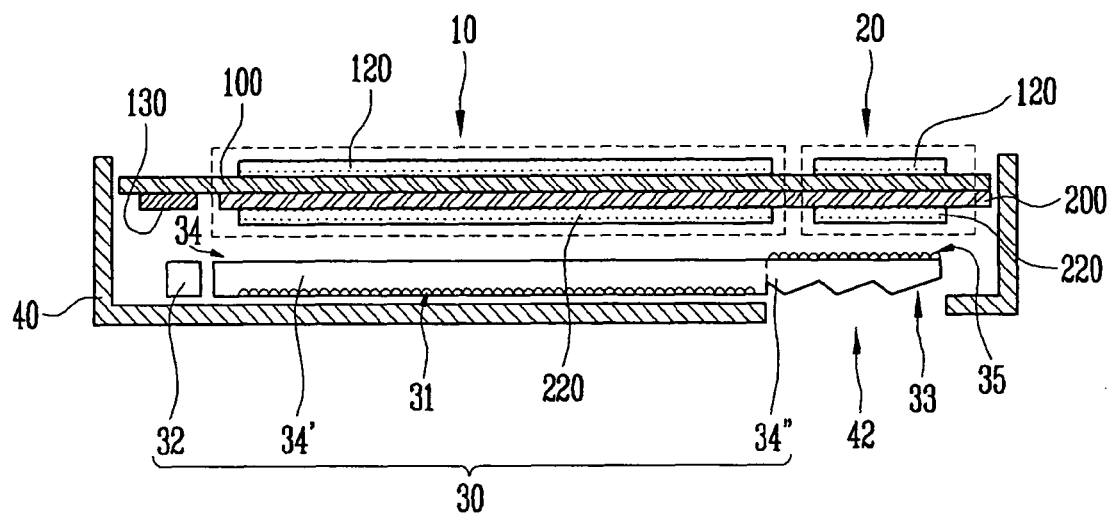
FIG. 1 schematically illustrates a configuration of a dual liquid crystal display device according to one exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the element or be indirectly on the element with one or more intervening elements interposed therebetween. Also, when an element is referred to as being "connected to" another element, it can be directly connected to the element or be indirectly connected to the element with one or more intervening elements interposed therebetween. Further, when terms of orientation, such as "under", "above", "below", etc., are used, the orientation merely refers to the illustrated orientation. Hereinafter, like reference numerals refer to like elements.

Figure 2:
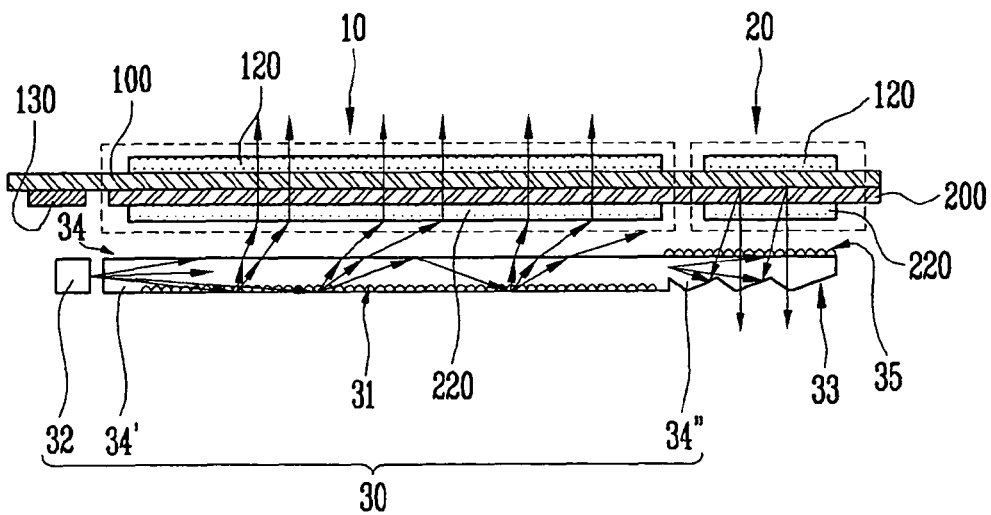
FIG. 2 schematically illustrates an operation of the dual liquid crystal display device as shown in FIG. 1.

FIG. 1 schematically illustrates a configuration of a dual liquid crystal display device according to one exemplary embodiment of the present invention, and FIG. 2 schematically illustrates an operation of the dual liquid crystal display device as shown in FIG. 1.

Referring to FIG. 1, the dual liquid crystal display device 1 according to one exemplary embodiment of the present invention includes a first liquid crystal display panel 10 displaying an image on a predetermined surface thereof; a second liquid crystal display panel 20 formed on the same substrate as the first liquid crystal display panel 10 to display an image on a predetermined surface thereof; a light guide disposed under the first and second liquid crystal display panels, the light guide 34 including a first light guide block 34' corresponding to the first liquid crystal display panel 20 and having light reflecting dot patterns 31 formed on a predetermined surface thereof, and a second light guide block 34" corresponding to the second liquid crystal display panel 20 and having V-grooves 33 formed in a first surface thereof and dot patterns 35 formed in a second surface thereof; a light source 32 disposed adjacent the first guide block 34', the light source 32 emitting light into the first light guide block 34'; and a housing 40 housing the first and second liquid crystal display panels 10 and 20, the light source 32, the first light guide block 34' and the second light guide block 34", the housing having opening 42 correspond to the second surface, i.e., image display surface, of the second liquid crystal display panel 20.

In this case, it is characterized in that the first liquid crystal display panel 10 is provided as a transmissive liquid crystal display panel, and the second liquid crystal display panel 20 is provided as a reflective liquid crystal display panel.

Also, the transmissive and reflective liquid crystal display panels 10 and 20 are formed using a pair of the same substrates. For this purpose, a thin film transistor array (not shown) and a transparent electrode (not shown) are formed in a region corresponding to the first region of the first substrate 100, and a thin film transistor array (not shown) and a reflective electrode (not shown) are formed in a region corresponding to the second region of the first substrate 100. Also, a common electrode (not shown) and a color filter pattern (not shown) are formed in the first and second region of the second substrate 200 corresponding respectively to the first and second regions of the first substrate 100. A liquid crystal layer (not shown) is formed between the first substrate 100 and the second substrate 200. Also, first polarizing plates 120 and second polarizing plates 220 are formed on upper and lower sides of both the transmissive and reflective liquid crystal display panels 10 and 20.

The transmissive liquid crystal display panel 10 is formed in the first regions of the first substrate 100 and the second substrate 200 via the first polarizing plates 120 and the second polarizing plates 220, and the reflective liquid crystal display panel 20 is formed on the second regions of the first substrate 100 and the second substrate 200.

Also, a drive circuit block 130 to drive the transmissive and reflective liquid crystal display panels 10 and 20 is installed on one side of the first substrate 100 disposed outside the region of the transmissive liquid crystal display panel 10.

The backlight unit 30 includes a light source 32 and a light guide 34, as shown in FIG. 1. In particular, the light guide 34 is disposed in first and second regions respectively corresponding to the transmissive and reflective liquid crystal display panels 10 and 20. Also, the light guide 34 includes first light guide block 34' corresponding to the transmissive liquid crystal display panel 10 and having a dot pattern 31 formed in a first surface thereof, and second light guide block 34" corresponding to the reflective liquid crystal display panel 20 and having V-grooves 33 formed in a first surface thereof and dot patterns 35 formed in a second surface thereof. Therefore, the light guide 34 is able to facilitate the control of the brightness uniformity for the transmissive liquid crystal display panel 10, and also to facilitate the control of the quantity of light and other characteristics for the reflective liquid crystal display panel 20, as well as to improve the viewing angle and vision.

By forming dot patterns 35 in the second surface of the second light guide block 34", it is particularly possible to solve the problems caused only by the V-grooves 33 formed in the first surface of the second light guide block 34", that is, the problems that bright lines appear when a viewing angle gets narrow and it is difficult to control the path of light due to the prism pattern of the V-grooves 33.

That is to say, the viewing angle and vision may be improved due to the dispersion function that the light reflected from the V-grooves 33 is scattered by further forming dot patterns 35 in an opposite surface (second surface) of the surface (first surface) on which the V-grooves 33 are formed.

Referring to FIG. 2, light generated from the light source 32 enters the second polarizing plate 220, which is formed in a lower portion of the transmissive liquid crystal display panel 10, through the first light guide block 34' of the light guide 34. In this case, the transmissive liquid crystal display panel 10 operates in a transmissive mode to display an image on an opposite surface (display surface) to a surface into which light travels, that is, a first surface.

In this case, the present invention is characterized in that a plurality of dot patterns 31 are formed in the first surface of the first light guide block 34'. The dot patterns 31 are formed to control the brightness for the first transmissive liquid crystal display panel 10 more uniformly. That is to say, a plurality of the dot patterns 31 perform a back lighting function for the transmissive liquid crystal display panel 10.

Also, light, which is transmitted to the second light guide block 34" coupled to one side of the first light guide block 34', that is, the second light guide block 34" disposed remotest from the light source 30, enters the second polarizing plate 220 of the reflective liquid crystal display panel 20, and is reflected by a reflective electrode (not shown) formed on the first substrate 100 of the reflective liquid crystal display panel 20. Therefore, the reflective liquid crystal display panel 20 operates in a reflective mode to display an image on an image display surface (a first surface) of the reflective liquid crystal display panel 20.

In this case, the present invention is characterized in that a plurality of V-grooves are formed on the first surface of the second light guide block 34". The V-grooves are formed to facilitate the control of quantity of light and the other characteristics for the second reflective liquid crystal display panel 20. That is to say, a plurality of the V-grooves 33 perform a front lighting function for the reflective liquid crystal display panel 20.

Also, dot patterns 35 are further formed in the second surface of the second light guide block 34", as shown in FIGS. 1 and 2. Therefore, it is particularly possible to solve the problems caused only by the V-grooves 33 formed in the first surface of the second light guide block 34", that is, the problems that bright lines appear when a viewing angle gets narrow and it is difficult to control the path of light due to the prism pattern of the V-grooves 33.

That is to say, the viewing angle and vision may be improved due to the dispersion function that the light reflected from the V-grooves 33 is scattered by further forming dot patterns 35 in an opposite surface (second surface) to the surface (first surface) on which the V-grooves 33 are formed.

Also, the present invention is characterized in that the light source 32 is disposed under the substrate 100 outside the region of the transmissive liquid crystal display panel 10. Therefore, since the light source 32 is disposed adjacent to the transmissive region, it is easy to control the brightness uniformity that is one of important factors in the transmissive liquid crystal display device. Also, it is easy to control the light source 32 and the other characteristics since any excessive light entering the second light guide block 34" is used to control the reflective region.

According to one exemplary embodiment of the present invention as described above, the dual liquid crystal display device is also realized with a pair of the same substrates. Therefore, the dual liquid crystal display device are advantageously manufactured to be slim in thickness since it has a dual structure with the same thickness as a conventional single structure liquid crystal display devices. Also, the dual liquid crystal display device according to the present invention has advantages in aspect of cost efficiency in that the manufacturing cost such as the material cost and the processing cost may be significantly reduced, compared to the conventional single structure liquid crystal display devices.

Figure 3:
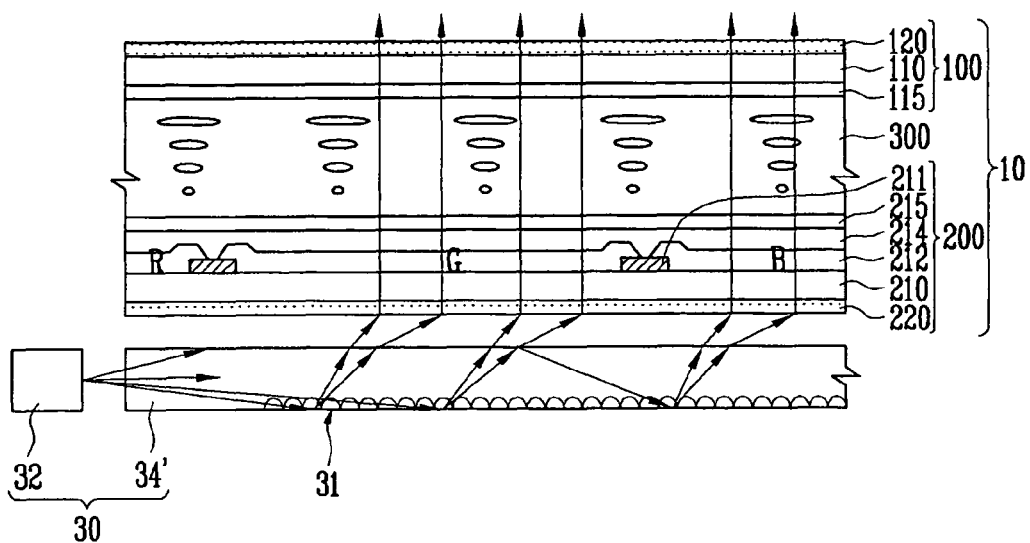
FIG. 3 is a cross-sectional view showing a region corresponding to a first liquid crystal display panel in the dual liquid crystal display device as shown in FIG. 1.
Figure 4:
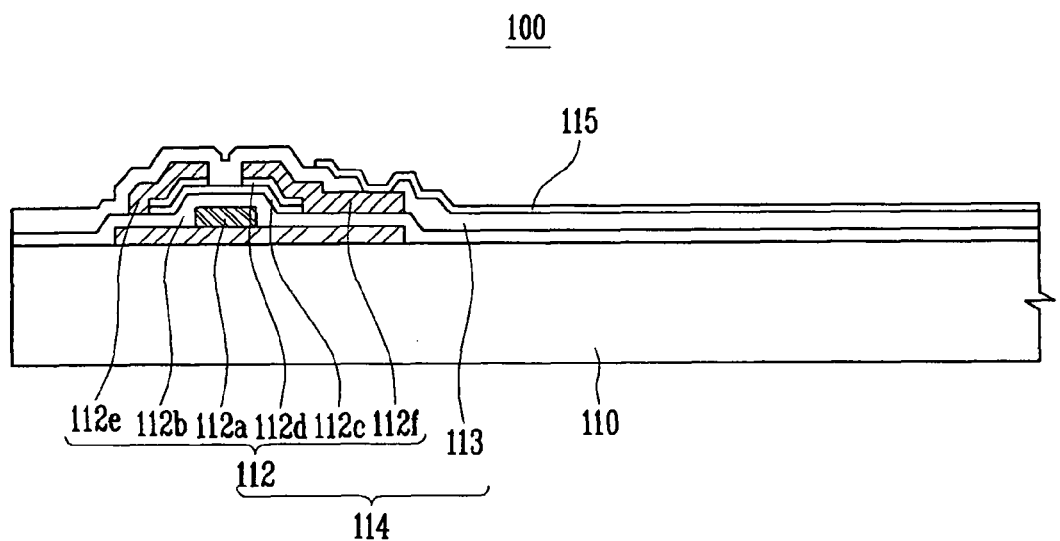
FIG. 4 is a cross-sectional view specifically showing a first substrate as shown in FIG. 3.

FIG. 3 is a cross-sectional view showing a region corresponding to transmissive liquid crystal display panel 10 in the dual liquid crystal display device as shown in FIG. 1. Also, FIG. 4 is a cross-sectional view specifically showing a first substrate as shown in FIG. 3.

Referring to FIG. 3, the light source 32 generating light and the first light guide block 34' of the light guide 34 supplying light irradiated from the light source 32 to the transmissive liquid crystal display panel 10 are disposed under the drive circuit 130 and transmissive liquid crystal display panel 10. In this case, the light source 32 and the light guide 34 constitute backlight unit 30.

In this case, the present invention is characterized in that a plurality of dot patterns 31 are formed in a first surface of the first light guide block 34'. The dot patterns 31 are formed to control the brightness for the first transmissive liquid crystal display panel 10 more uniformly. That is to say, a plurality of the dot patterns 31 perform a back lighting function for the transmissive liquid crystal display panel 10.

The transmissive liquid crystal display panel 10 includes a first substrate 100, a second substrate 200 disposed spaced apart from the first substrate 100 at a predetermined distance, and a liquid crystal layer 300 interposed between the first and second substrates. Also, the first polarizing is plates 120 and the second polarizing plates 220 are formed on upper and lower sides of the transmissive liquid crystal display panel 10, respectively.

As shown in FIGS. 3 and 4, the first substrate 100 includes a transparent substrate 110, a thin film transistor (hereinafter, referred to as 'TFT') array 114 formed on the transparent substrate 110, and a pixel electrode 115 formed on the TFT array 114.

The TFT array 114 is composed of a TFT 112 and a first passivation layer 113 to protect the TFT 112. The TFT 112 includes a gate electrode 112a, a gate insulator 112b, an active layer 112c, an ohmic contact layer 112d, a source electrode 112e, and a drain electrode 112f.

The gate electrode 112a is provided to correspond to a light shielding layer 211 formed on a transparent substrate 210 of the second substrate 200, and the gate insulator 112b is formed on an overall surface of the transparent substrate 210 on which the gate electrode 112a is formed. The active layer 112c and the ohmic contact layer 112d are formed on the gate insulator 112b to correspond to the gate electrode 112a. The source electrode 112e and the drain electrode 112f are disposed space apart from each other and formed on the ohmic contact layer 112d.

The source and drain electrodes 112e and 112f as well as the gate electrode 112a are also provided in a region on which the light shielding layer 211 is formed. Therefore, the light shielding layer 211 may prevent light entering the second substrate 200 from being reflected by the gate electrode 112a, the source electrode 112e and the drain electrode 112f.

The first passivation layer 113 formed on the TFT 112 partially exposes the drain electrode 112f of the TFT 112. The pixel electrode 115 is formed on the first passivation layer 113 and the exposed drain electrode 112f, and then electrically coupled to the drain electrode 112f.

The pixel electrode 115 is composed of transmissive electrodes made of indium tin oxide as (ITO), indium zinc oxide (IZO), or the like.

Also, a light shielding layer 211 and a color filter layer 212 are formed on the transparent substrate 210 of the second substrate, and a second passivation layer 214 is formed on the light shielding layer 211 and the color filter layer 212.

The color filter layer 212 is composed of red, green and blue color filters (R, G and B) that are disposed spaced apart at a predetermined distance from each other. The light shielding layers 211 are provided between the color filters (R, G and B), and demarcate a region on which each color filter is formed, thereby improving the color reproducibility of each of the color filters. A second passivation layer 214 made of a photocurable material is formed on the color filter layer 212 to protect the color filter layer 212.

A common electrode 215 is formed on the second passivation layer 214. The common electrode 215 is made of a transparent conductive material and formed on the second passivation layer 214 to have a uniform thickness.

The transmissive liquid crystal display panel 10 as thus configured displays a picture by irradiating light having entered from the light source 32 and the light guide 34 to the outside, that is, a first surface, via the liquid crystal layer 300 and the transmissive electrode 115 of the transmissive liquid crystal display panel 10. That is to say, the transmissive liquid crystal display panel 10 operates in a transmissive mode.

Figure 5:
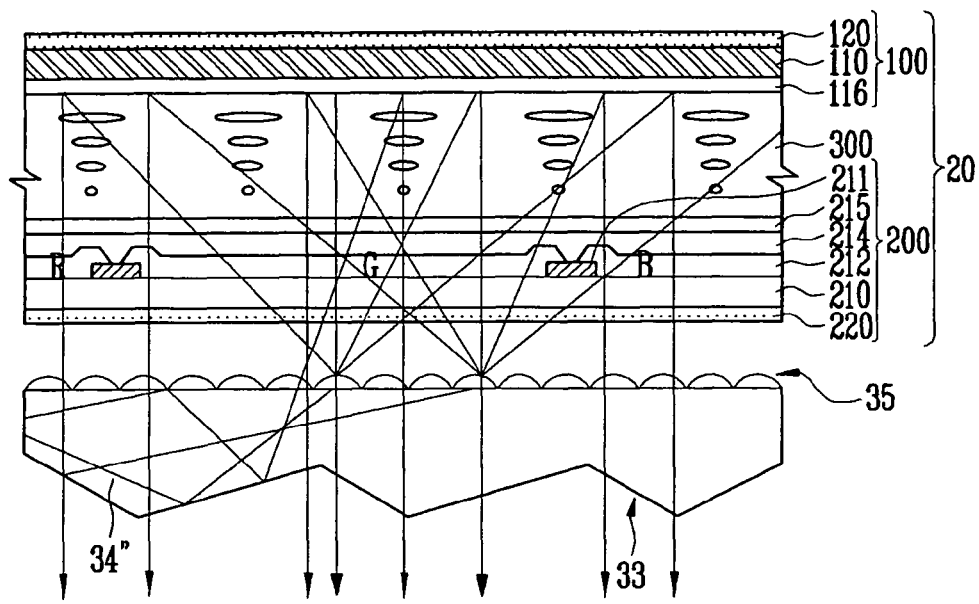
FIG. 5 is a cross-sectional view showing a region corresponding to a second liquid crystal display panel in the dual liquid crystal display device as shown in FIG. 1.
Figure 6:
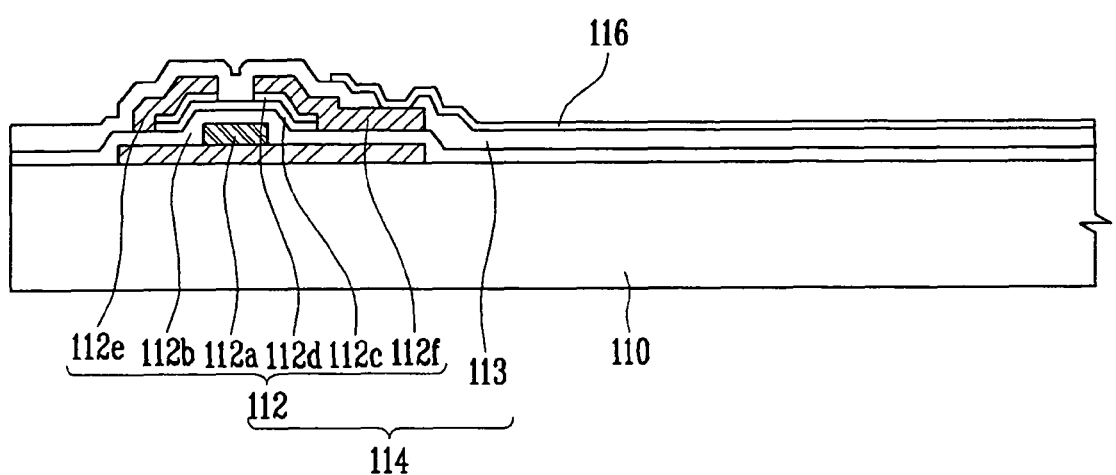
FIG. 6 is a cross-sectional view specifically showing a first substrate as shown in FIG. 5.

FIG. 5 is a cross-sectional view showing a region corresponding to reflective liquid crystal display panel 20 in the dual liquid crystal display device as shown in FIG. 1. Also, FIG. 6 is a cross-sectional view specifically showing a first substrate as shown in FIG. 5.

Referring to FIG. 5, light transmitted to the second light guide block 34" of the light guide disposed under the reflective liquid crystal display panel 20 enters the reflective liquid crystal display panel 20 by means of the second light guide block 34".

In this case, it is characterized in that a plurality of V-grooves 33 are formed on a first 18 surface of the second light guide block 34". The V-grooves 33 are formed to facilitate the control and quantity of light and other characteristics for the reflective liquid crystal display panel 20. That is to say, a plurality of the V-grooves 33 perform a front lighting function for the reflective liquid crystal display panel 20.

Also, dot patterns 35 are further formed on the second surface of the second light guide block 34", as shown in FIG. 5. Therefore, it is possible to solve the problems caused only by the V-grooves 33 formed on the first surface of the second light guide block 34", that is, the problems that bright lines appear when a viewing angle gets narrow and it is difficult to control the path of light due to the prism pattern of the V-grooves 33.

That is to say, the viewing angle and vision may be improved due to the dispersion function that the light reflected from the V-grooves 33 is scattered by further forming dot patterns 35 on an opposite surface (second surface) to the surface (first surface) on which the V-grooves 33 are formed.

The reflective liquid crystal display panel 20 includes a first substrate 100, a second substrate 200 disposed spaced apart from the first substrate 100 at a predetermined distance, and a liquid crystal layer 300 interposed between the first and second substrates.

In this case, the first substrate 100 and the second substrate 200 are defined in the same manner as the first substrate 100 and the second substrate 200 of the above-mentioned transmissive liquid crystal display panel 10. This is why the transmissive and reflective liquid crystal display is panels 10 and 20, according to one exemplary embodiment of the present invention, are formed in different regions (first and second regions) using a pair of the same substrates (first and second substrates 100 and 200).

As shown in FIGS. 5 and 6, the first substrate 100 includes a transparent substrate 110, a thin film transistor (hereinafter, referred to as 'TFT') array 114 formed on the transparent substrate 110, and a reflective electrode 1.16 formed on the TFT array 114.

The TFT array 114 is composed of a TFT 112 and a first passivation layer 113 to protect the TFT 112. The TFT 112 includes a gate electrode 112a, a gate insulator 112b, an active layer 112c, an ohmic contact layer 112d, a source electrode 112e and a drain electrode 112f.

The gate electrode 112a is provided to correspond to a light shielding layer 211 formed on a transparent substrate 210 of the second substrate 200, and the gate insulator 112b is formed on an overall surface of the transparent substrate 110 on which the gate electrode 112a is formed. The active layer 112c and the ohmic contact layer 112d are formed on the gate insulator 112b to correspond to the gate electrode 112a. The source electrode 112e and the drain electrode 112f are disposed space apart from each other, and formed on the ohmic contact layer 112d.

The source and drain electrodes 112e and 112f as well as the gate electrode 112a are also provided in a region on which the light shielding layer 211 is formed. Therefore, the light shielding layer 211 may prevent light entering the second substrate 200 from being reflected by the gate electrode 112a, the source electrode 112e and the drain electrode 112f.

The first passivation layer 113 formed on the TFT 112 partially exposes the drain electrode 112f of the TFT 112. The reflective electrode 116 is formed on the first passivation layer 113 and the exposed drain electrode 112f, and then electrically coupled to the drain electrode 112f.

The reflective electrode 116 is made of metals such as aluminum-neodymium (AlNd) and coupled to the drain electrode 112f. The reflective electrode 116 is preferably patterned to have a shape of a plurality of lens so as to enhance the reflectance of the incident light.

Also, a light shielding layer 211 and a color filter layer 212 are formed on the transparent substrate 210 of the second substrate 200, and a second passivation layer 214 is formed on the light shielding layer 211 and the color filter layer 212.

The color filter layer 212 is composed of red, green and blue color filters (R, G and B) that are disposed spaced apart at a predetermined distance from each other. The light shielding layers 211 are provided between the color filters (R, G and B), and demarcate a region on which each color filter is formed, thereby improving the color reproducibility of each of the color filters. A second passivation layer 214 made of a photocurable material is formed on the color filter layer 212 to protect the color filter layer 212.

A common electrode 215 is formed on the second passivation layer 214. The common electrode 215 is made of a transparent conductive material, and then formed on the second passivation layer 214 to have a uniform thickness.

The reflective liquid crystal display panel 20 as thus configured displays a picture on a display surface thereof by allowing light transmitted to the second light guide block 34" to enter the reflective liquid crystal display panel 20 and transmit the liquid crystal layer 300 of the reflective liquid crystal display panel 20 and reflecting the light by means of the reflective electrode 116. That is to say, reflective liquid crystal display panel 20 operates in a reflective mode.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A dual liquid crystal display device, comprising:
a first liquid crystal display panel displaying an image on a display surface thereof;
a second liquid crystal display panel formed on the same substrate as the first liquid crystal display panel to display an image on a display surface thereof;
a light guide disposed under the first and second liquid crystal display panels, said light guide including:
a first light guide block corresponding to the first liquid crystal display panel and having dot patterns formed on a first surface thereof; and
a second light guide block corresponding to the second liquid crystal display panel and having V-grooves formed on a first surface thereof and dot pattern formed on a second surface thereof;
a light source disposed at an adjacent side of said first light guide block; and
a housing in which the first and second liquid crystal display panels, the light source and the light guide are seated, said housing having an opening corresponding to said display surface of the second liquid crystal display panel.

2. The dual liquid crystal display device according to claim 1, wherein the first liquid crystal display panel is realized with a transmissive liquid crystal display panel, and the second liquid crystal display panel is realized with a reflective liquid crystal display panel.

3. The dual liquid crystal display device according to claim 1, wherein the first and second liquid crystal display panels are formed respectively in a first region and a second region of first and second substrates that are a pair of the same substrates.

4. The dual liquid crystal display device according to claim 3, wherein a thin film transistor array and a transparent electrode are formed in a region corresponding to the first region of the first substrate, a thin film transistor array and a reflective electrode are formed in a region corresponding to the second region of the first substrate, and a common electrode and a color filter pattern are formed in the first and second regions of the second substrate corresponding to the first and second regions of the first substrate, respectively.

5. The dual liquid crystal display device according to claim 3, wherein a drive circuit block driving the first and second liquid crystal display panels is installed at one side of the first substrate outside the first or second regions.

6. The dual liquid crystal display device according to claim 1, wherein first polarizing plates and second polarizing plates are formed on upper and lower sides of both the first and second liquid crystal display panels.

7. The dual liquid crystal display device according to claim 5, wherein the light source is disposed below and adjacent to the drive circuit block.

8. A dual liquid crystal display device capable of displaying images on opposite sides thereof, said dual liquid crystal display device comprising:
a transmissive liquid crystal display panel displaying an image on a display surface thereof;
a reflective liquid crystal display panel formed on the same substrate as the transmissive liquid crystal display panel to display an image on a display surface thereof;
a light guide disposed under the transmissive and reflective liquid crystal display panels, said light guide including:
a first light guide block corresponding to the transmissive liquid crystal display panel and having dot patterns formed on a first surface thereof; and
a second light guide block corresponding to the reflective liquid crystal display panel and having V-grooves formed on a first surface thereof and dot pattern formed on a second surface thereof;

a light source disposed adjacent to said first light guide block; and a housing in which the transmissive and reflective liquid crystal display panels, the light source and the light guide are seated, said housing having an opening corresponding to said display surface of the second liquid crystal display panel.

9. The dual liquid crystal display device according to claim 8, said transmissive liquid crystal display panel comprising:

a thin film transistor array and a transparent electrode formed on said first substrate;

a second substrate having a common electrode and a color filter pattern formed thereon; and a liquid crystal layer disposed between said substrates.

10. The dual liquid crystal display device according to claim 9, further comprising:

a first polarizing plate, formed on said first substrate; and a second polarizing plate, formed on said second substrate, through which the light is transmitted to said transmissive liquid crystal display panel.

11. The dual liquid crystal display device according to claim 8, said reflective liquid crystal display panel comprising:

a thin film transistor array and a reflective electrode formed on said first substrate;

a second substrate having a common electrode and a color filter pattern formed thereon; and a liquid crystal layer disposed between said substrates.

12. The dual liquid crystal display device according to claim 11, further comprising:

a first polarizing plate formed on said first substrate; and a second polarizing plate, formed on said second substrate, through which the light is transmitted to said reflective liquid crystal display panel.

13. The dual liquid crystal display device according to claim 8, further comprising a drive circuit block driving the transmissive and reflective liquid crystal display panels, the drive circuit block being installed on one side of the substrate and above said light source.

* * * * *